United States Patent [19]
Levey

[11] Patent Number: 5,617,669
[45] Date of Patent: Apr. 8, 1997

[54] CHUM DISTRIBUTOR

[75] Inventor: Stewart Levey, New Milford, N.J.

[73] Assignee: Lure'em In, Inc., Ridgefield, N.J.

[21] Appl. No.: 438,108

[22] Filed: May 8, 1995

[51] Int. Cl.⁶ .................................................. A01K 97/02
[52] U.S. Cl. ........................................ 43/44.99; 43/42.06
[58] Field of Search ........................ 43/44.99, 55, 42.06, 43/41, 102

[56] References Cited

U.S. PATENT DOCUMENTS

| | | | |
|---|---|---|---|
| 1,497,199 | 6/1924 | Sutthoff. | |
| 2,111,959 | 3/1938 | Baxter | 43/55 |
| 2,503,490 | 4/1950 | Janz | 43/55 |
| 2,535,256 | 12/1950 | Benson et al. | 220/7 |
| 2,620,588 | 12/1952 | Critser | 43/55 |
| 2,709,317 | 5/1955 | Pease, Sr. | 43/44.99 |
| 2,711,610 | 6/1955 | Miller | 43/56 |
| 2,755,594 | 7/1956 | Booth et al. | 43/100 |
| 2,834,145 | 5/1958 | Kisiel et al. | 43/56 |
| 2,842,890 | 7/1958 | Goroni | 43/55 |
| 3,036,400 | 5/1962 | Anderson | 43/55 |
| 3,974,591 | 8/1976 | Ray | 43/43.14 |
| 4,829,705 | 5/1989 | Dorsey | 43/44.99 |
| 5,319,875 | 6/1994 | Brandolino | 43/41 X |

FOREIGN PATENT DOCUMENTS

| | | | |
|---|---|---|---|
| 2200022 | 7/1988 | United Kingdom | 43/44.81 |
| 2226743 | 7/1990 | United Kingdom | 43/44.99 |
| 94-10835 | 5/1994 | WIPO | 43/44.99 |

*Primary Examiner*—Jeanne M. Elpel
*Attorney, Agent, or Firm*—Ohlandt, Greeley, Ruggiero & Perle

[57] ABSTRACT

The container comprises a pair of longitudinally divided cylinder halves molded unitarily with a connecting "living hinge" running the entire length of the container. Mating fasteners are provided on the ends of the halves opposite the hinge. Weight-receiving pockets are molded integrally with the ends of the lower half.

13 Claims, 2 Drawing Sheets

CHUM DISTRIBUTOR

BACKGROUND OF THE INVENTION

This invention relates to a chum distributor for distributing chum to attract fish in either bottom fishing, reef fishing, lake or off-shore fishing. More specifically, this invention relates to a chum distributor in the form of a cylindrical perforated container adapted to receive a frozen chum "log" which, as the "log" thaws, passes chum into the surrounding water.

The prior art includes showings of chum baskets or distributors. Examples are the Ray U.S. Pat. No. 3,974,591 issued Aug. 17, 1976 which shows a hinged cylindrical container having perforate walls adapted to receive a chum mass. In this showing the fishing line, or leader, is conducted axially through the container and the chum mass.

The Dorsey U.S. Pat. No. 4,829,705 issued May 16, 1989 discloses a pair of perforated frusto-conical caps snapped together to include the chum thereinside, the joint between the caps being in a plane radial to the axis of the container.

The Dorsey U.S. Pat. No. 2,709,317 discloses a chum holder comprising a perforated cylindrical body having end caps, each end cap being centrally apertured to receive the fishing string.

One of the problems of prior art devices is that those made of plastic are not well adapted to bottom fishing because they tend to entrap air or are so light, with the consequence that they eventually may come up to the surface. It is also true that prior plastic devices Which are hinged together are in two parts, usually resulting in excess play between the parts so that the closure fasteners do not properly align.

The present invention provides the solution to both of these problems.

SUMMARY OF THE INVENTION

The present invention is a chum distributor in the form of a container comprising a pair of longitudinally divided cylinder halves molded unitarily with a connecting "living hinge" running the entire length of the cylindrical container. Mating fasteners are provided on the ends of the halves opposite the hinge.

Additionally, one of the halves is formed at its opposite ends with weight-receiving pockets also molded integrally with the half. The pockets comprise an end wall of the container and a second partition wall spaced inward from the end wall and having a flap integral therewith adapted to be folded down over the pocket and having tabs adapted to be tucked into slots in the end wall of the container to secure it closed, weights being previously inserted in the pocket interior.

BRIEF DESCRIPTION OF THE DRAWINGS

Further objects and features of the invention will be apparent to those skilled in the art from a study of the following specification and the accompanying drawings, all of which disclose a non-limiting embodiment of the invention. In the drawings.

DESCRIPTION OF THE PREFERRED EMBODIMENTS

Figure 1:
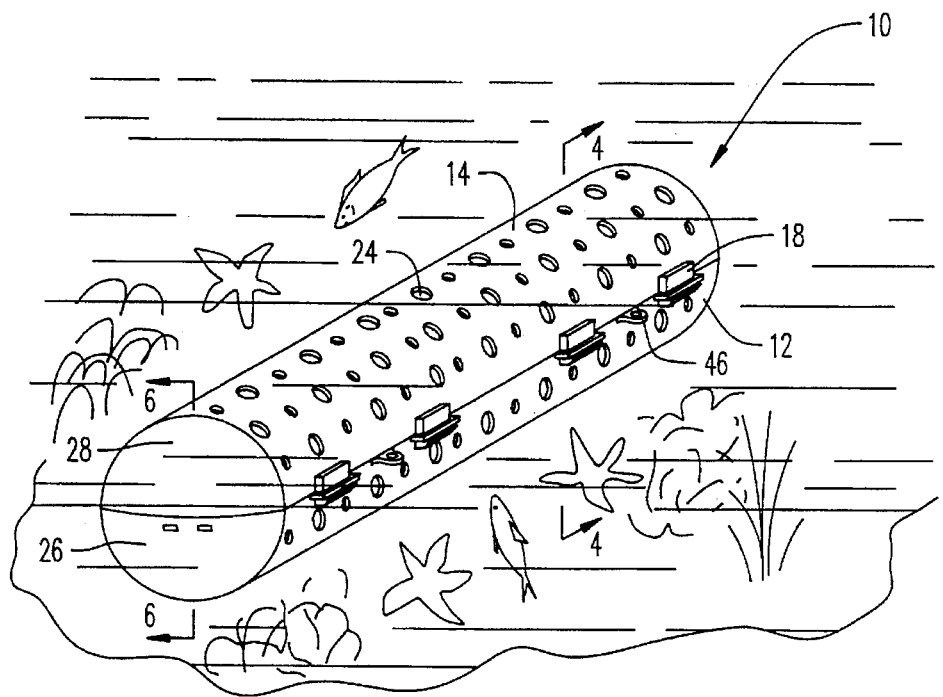
FIG. 1 is a perspective view of a chum distributor embodying the invention.

A chum distributor embodying the invention is generally designated 10 in FIG. 1. In FIG. 1 the distributor is shown in closed condition and is disposed on the bottom where it may be rolled by the current or waves to dispense better the chum initially disposed thereinside.

The distributor comprises a cylindrical container divided longitudinally and defined by a bottom half 12 and a top half 14. These halves are joined longitudinally for there entire length by a "living hinge" 16 (FIG. 3). Opposite the hinge 16 there are formed on the curved side walls of the top and bottom half cooperating fastener means 18 comprising a male element 20 and a female element 22 molded respectively into the two halves as shown in FIGS. 1 and 2.

Figure 2:
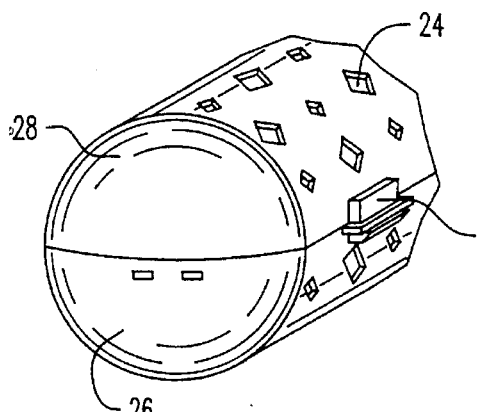
FIG. 2 is an enlarged fragmentary perspective view of an end of the distributor.
Figure 3:
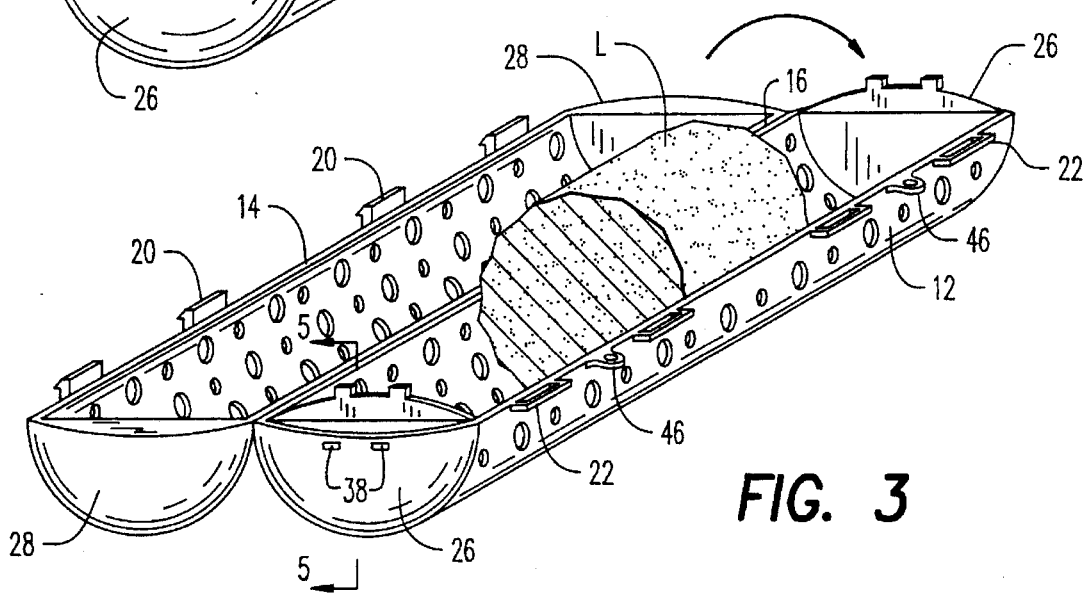
FIG. 3 is a perspective fragmentary view of the distributor in open condition showing a chum log therein.
Figure 4:
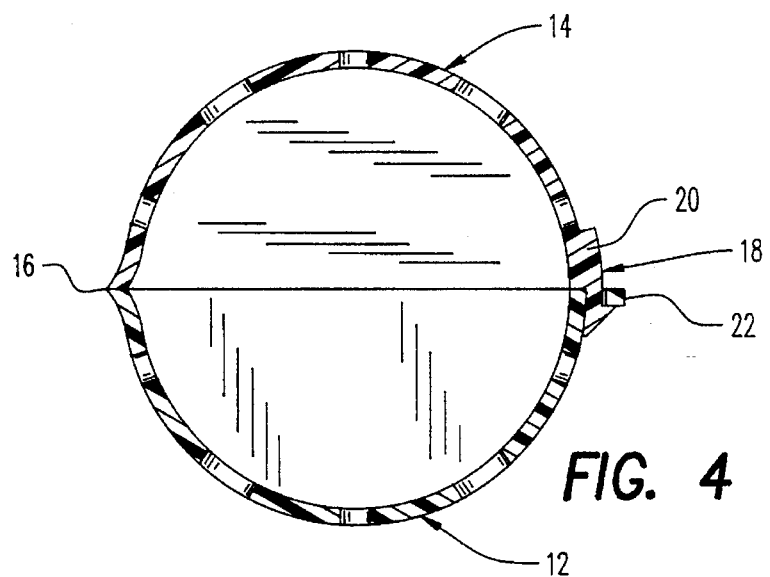
FIG. 4 is an enlarged sectional view taken on the line 4—4 of FIG. 1.
Figure 5:
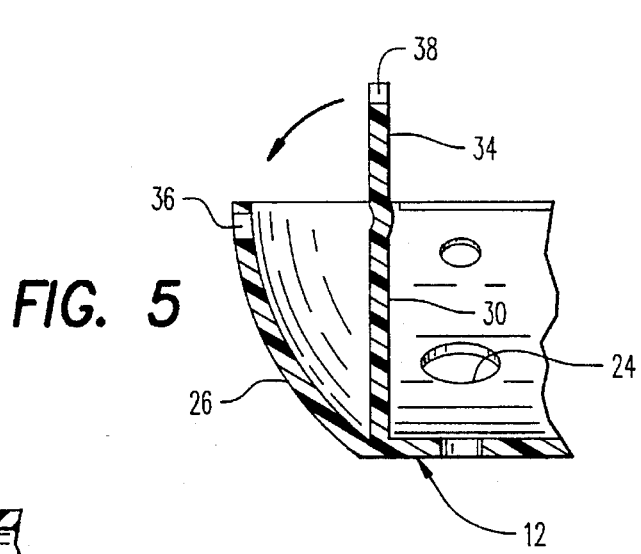
FIG. 5 is an enlarged fragmentary sectional view showing the bottom half of the distributor with the weight pocket flap open.

The side curved walls of the container are formed with perforations 24 which may vary in size and may be circular (FIG. 1) or polygonal, such as square (FIG. 2). The end pieces 26 and 28 of each of the half-cylindrical parts are generally semi-circular and joined to the curved side walls of the container as shown. Preferably the end pieces are dished outwardly rather than being absolutely flat, and in the case of end pieces 28 of the upper half 14, they may be formed so that they thicken toward the axis (FIG. 6).

Figure 6:
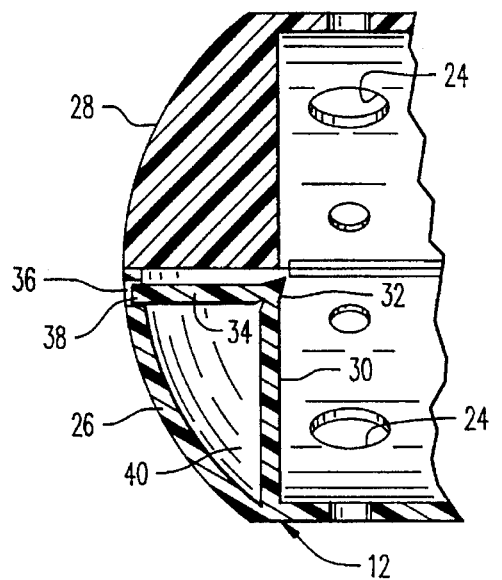
FIG. 6 is a fragmentary sectional view of an end of the distributor showing the weight pocket flap in closed condition.

As shown in FIG. 6, there is spaced toward the center of the container from the end pieces 26 of the lower half 12 a partition 30 extending upward from the juncture of the end piece 26 and the curving wall as shown. The upper end of the partition 30 is formed with a short living hinge 32 and a flap 34 having tabs 36 thereon fitting into slots 38 in the end wall 26. The purpose of this arrangement is to provide closed space or pocket 40 for retaining weights such as stones or fishing weights adapted to assure that the chum distributor sinks to the floor when and if desired.

While the fasteners 18 are in the form of a male/female combination of elements, it should be clear that other closure elements are envisioned. For instance, the male element may comprise a short outwardly extending head disposed more or less radially with respect to the cylindrical container and the female element on the other half of the container may comprise a mere loop unitarily formed with the half and adapted to be snapped over the head to secure the unit closed.

Intermediate the closures 18 the longitudinal edge of the lower curved wall is provided with eyelets 46 for attaching a surface line by which the distributor can be retrieved.

As is shown, the eyelets and closures 18 preferably do not protrude outward to a substantial extent and do not interfere with the rolling of the distributor as it is met with currents and wave motion on the bottom.

In actual practice the chum distributor of the invention may vary in length from one foot to six feet and in diameter from 3" to 6". The apertures 24 may range in size as shown, 3/8" to 5/8" being a reasonable range. The fact that the one-piece unit as shown in FIG. 3 is easily openable to expose its interior makes it not only easy to load but also easy to clean. The chum distributor comprises a unitary plastic structure that is preferably a polyolefin, such as polypropylene and polyethylene. For example, the entire structure may be molded from polypropylene which has been found to be especially effective in the formation of the "living hinges". However, polyethylene can provide a satisfactory unit. The entire unit is molded as a single piece.

In use the closures 18 are disengaged and the unit is opened as in FIG. 3. The chum, which may be a commercially available frozen chum "log" L, may be inserted as shown or the log may be homemade by the fisherman himself. Chum, as is well known may comprise a vast variety of ground up "bait", such as fish, shrimp, clams, corn, catfish, rice and any other combination that the fisherman may concoct.

To further attract fish, the chum distributor may be produced in a fluorescent color such as yellow or red, or a combination thereof.

The invention described here may take a number of forms. It is not limited to the embodiment disclosed but is of a scope defined by the following claim language which may be broadened by an extension of the right to exclude others from making, using or selling the invention as is appropriate under the doctrine of equivalents.

What is claimed is:

1. A chum distributor comprising a unitary molded plastic structure having an opened and a closed condition; the structure in the open condition comprising a pair of side-by-side coextensive cylinder halves divided longitudinally and hinged together by a living hinge along their adjacent longitudinal edges, each half comprising spaced parallel semi-circular end pieces and a curved perforated side wall connected to and extending between the end pieces, the opened container forming two adjacent units, the remote longitudinal edges being formed with cooperant fastener means, at least one of the semi-circular end pieces being formed with weight-receiving pocket means; the structure in the closed condition having the two halves pivoted closed with the cooperant fastener means engaged to form a perforated cylindrical container.

2. A chum distributor as claimed in claim 1 wherein the cooperant fastener means are relatively flat against the respective side walls and comprise resilient heads and opposing sockets on the respective halves.

3. A chum distributor as claimed in claim 1 wherein at least one end piece is formed with a foldable flap which can be folded to close one of said pocket means.

4. A chum distributor as claimed in claim 1 wherein the pocket means is accessible only from the inside of the structure in its open condition.

5. A chum distributor as claimed in claim 1 wherein at least one end piece being formed with pocket means is only on one of the halves.

6. A chum distributor as claimed in claim 1 wherein the perforations are staggered.

7. A chum distributor as claimed in claim 6 wherein the perforations are of different sizes.

8. A chum distributor as claimed in claim 6 wherein the perforations are circular.

9. A chum distributor as claimed in claim 1 wherein the structure is formed with an eyelet for securing a surface line.

10. A chum distributor as claimed in claim 1 wherein the plastic is a polyolefin.

11. A chum distributor as claimed in claim 10 wherein the plastic is polypropylene.

12. A chum distributor as claimed in claim 1 wherein in the closed condition the structure is elongate.

13. A chum distributor as claimed in claim 1 wherein the structure is colored with a fluorescent material.

\* \* \* \* \*